United States Patent
Wang et al.

(10) Patent No.: US 7,391,365 B2
(45) Date of Patent: Jun. 24, 2008

(54) MICRO-TRACKING DEVICE FOR TRACING ACTION TRACK OF ANIMALS AND METHOD FOR USING THE SAME

(75) Inventors: Bily Wang, Hsin Chu (TW);
Chung-Hsien Su, Tai Nan (TW);
Yuan-Hsiu Yang, Kao Hsiung (TW)

(73) Assignee: Youngtek Electronics Corporation, Hsinchu (TW)

( * ) Notice: Subject to any disclaimer, the term of this patent is extended or adjusted under 35 U.S.C. 154(b) by 0 days.

(21) Appl. No.: 11/476,578

(22) Filed: Jun. 29, 2006

(65) Prior Publication Data

US 2008/0001815 A1 Jan. 3, 2008

(51) Int. Cl.
*G01S 5/14* (2006.01)
*G08B 1/08* (2006.01)
*G08B 23/00* (2006.01)
*H04Q 7/00* (2006.01)

(52) U.S. Cl. .............................. 342/357.07; 340/539.13; 340/573.1; 340/573.3

(58) Field of Classification Search ............ 342/357.07; 340/573.1, 573.3, 539.13
See application file for complete search history.

(56) References Cited

U.S. PATENT DOCUMENTS 6,163,503 A * 12/2000 Gudbjornsson ................ 367/6
2002/0021219 A1 * 2/2002 Edwards ................... 340/573.1
2006/0255935 A1 * 11/2006 Scalisi et al. ........... 340/539.13

OTHER PUBLICATIONS

L.D. Mech et al, A critique of wildlife radio-tracking and its use in national parks: a report to the U.S. National Park Service, U.S. Geological Survey, Northern Prairie Wildlife Research Center, Jamestown, p. 30-31, Feb. 2000.*
R. Low, Average Bird Weights, http://www.avianweb.com/AverageBirdWeights.htm, unknown.*
F.G. Benedict et al., The Measurement of the Basal Heat Production of Pigeons II. Physiological Technique, Journal of Nutrition vol. 1(6), p. 497, Jul. 1929.*
I. Steiner et al., A GPS logger and software for analysis of homing pigeons and small mammals, Physiology & Behavior, vol. 71, p. 589-569, Dec. 2000.*
K. von Hünerbein et al., Flight Tracks of Homing Pigeons Measured with GPS, Journal of Navigation, vol. 54(2), p. 167-175, May 2001.*
Juice Batteries, http://www.juicebattery.com, Jul. 2005.*
L.D. Mech et al, A critique of wildlife radio-tracking and its use in national parks: a report to the U.S. National Park Service, U.S. Geological Survey, Northern Prairie Wildlife Research Center, Jamestown, p. 1-80, Feb. 2000.*

* cited by examiner

*Primary Examiner*—Thomas H. Tarcza
*Assistant Examiner*—Fred H. Mull
(74) *Attorney, Agent, or Firm*—Rosenberg, Klein & Lee

(57) ABSTRACT

A micro-tracking device for tracing action track of animals is disclosed. The micro-tracking device has a weight between 1 and 10 grams and is fastened on any animal's any position (especially a flight animal's concave ring portion between its body and tail), for capturing action track information (for example, a current height value and a speed value of about flight animal, current position and time information about the flight animal) of the animal using GPS and controlling action statuses of the animal effectively.

13 Claims, 4 Drawing Sheets

MICRO-TRACKING DEVICE FOR TRACING ACTION TRACK OF ANIMALS AND METHOD FOR USING THE SAME

BACKGROUND OF THE INVENTION

1. Field of the Invention

The present invention relates to a micro-tracking device for tracing action track of animals and a method for using the same, and particularly relates to a micro-tracking device that has a weight of between 1 and 10 grams and is fastened on any animal's any position (especially a flight animal's concave ring portion between its body and tail), for capturing information regarding the animal's movements using GPS.

2. Description of the Related Art

In ancient times, people delivered letters using doves (or homing pigeons). The main reason for this was that these birds have the natural ability to recognize and find their way back home. Although we now live in the telecommunication age, these birds are still generally used and reared because they symbolize peace and their natural ability to recognize and find their way back home. For example, peace doves are often used in national celebrations, and racing pigeons are often involved in races for honor and awards.

Every dove for racing needs to be trained for a long time to achieve excellence in competitions. Therefore, breeders give doves flight training everyday for physical exercise. For example, flying around dovecots or certain places.

Sometimes racing doves take a rest in the middle of a race when breeders cannot see them and this affects the effect of training. So the method of training the birds usually involves waving red flags to keep the birds flying. But it is not easy to control the flight path around certain terrains, let alone the gaining of flight orbit and reference (height, speed etc.,) is even harder.

SUMMARY OF THE INVENTION

The present invention provides a micro-tracking device for tracing action track of animals. The micro-tracking device has a weight between 1 and 10 grams and is fastened on any animal's any position (especially a flight animal's concave ring portion between its body and tail), for capturing action track information (for example, a current height value and a speed value of about flight animal, current position and time information about the flight animal) of the animal by using a GPS and controlling action statuses of the animal effectively.

A first aspect of the present invention is a micro-tracking device for tracing action track of animals, comprising a casing module, a MPU (Micro Process Unit), a GPS module, a memory module and a power supply module. The casing module has a fastening device fastened on an animal. The MPU module is disposed in the casing module. The GPS module is disposed in the casing module and is at least electrically connected with the MPU module, wherein the GPS module has an antenna for receiving action track information of the animal. The memory module is disposed in the casing module and is at least electrically connected with the MPU module for recording and storing the action track information, and then the power supply module is disposed in the casing module and is at least electrically connected with the MPU module for supplying power.

A second aspect of the present invention is a method of using a micro-tracking device for tracing action track of animals, comprising: fastening the micro-tracking device on an animal by a fastening device of the micro-tracking device; receiving action track information of the animal by an antenna of a GPS module of the micro-tracking device; recording and storing the action track information of the animal in a memory module of the micro-tracking device; and transmitting the action track information of the animal from the memory module to an external storage device.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
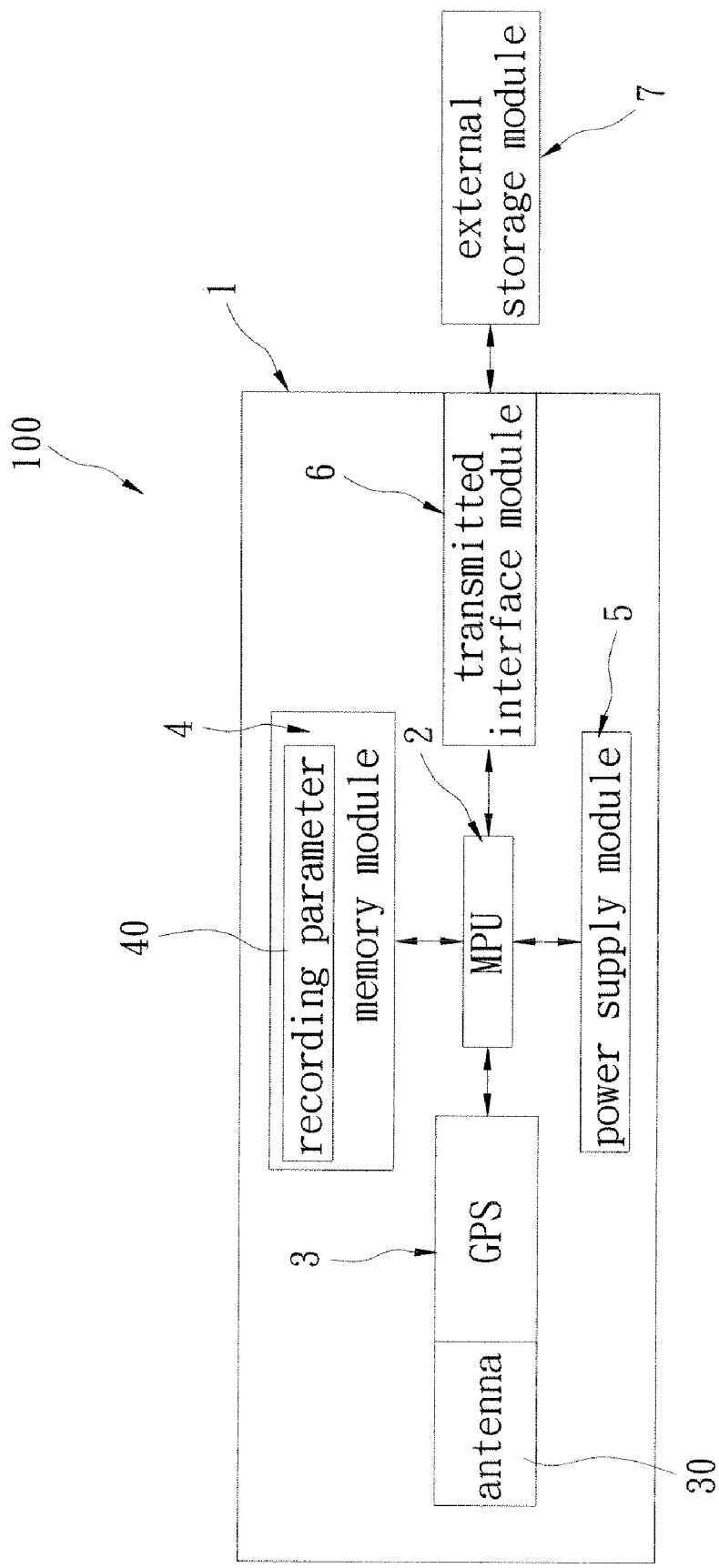
FIG. 1 is a function block diagram of a micro-tracking device for tracing action track of animals according to the first embodiment of the present invention.

FIG. 1 shows a function block diagram of a micro-tracking device for tracing action track of animals according to the first embodiment of the present invention. The micro-tracking device 100 includes a casing module 1, a MPU (Micro Process Unit) 2, a GPS module 3, a memory module 4 and a power supply module 5. The micro-tracking device 100 has a weight is between 1 and 10 gram.

Figure 2:
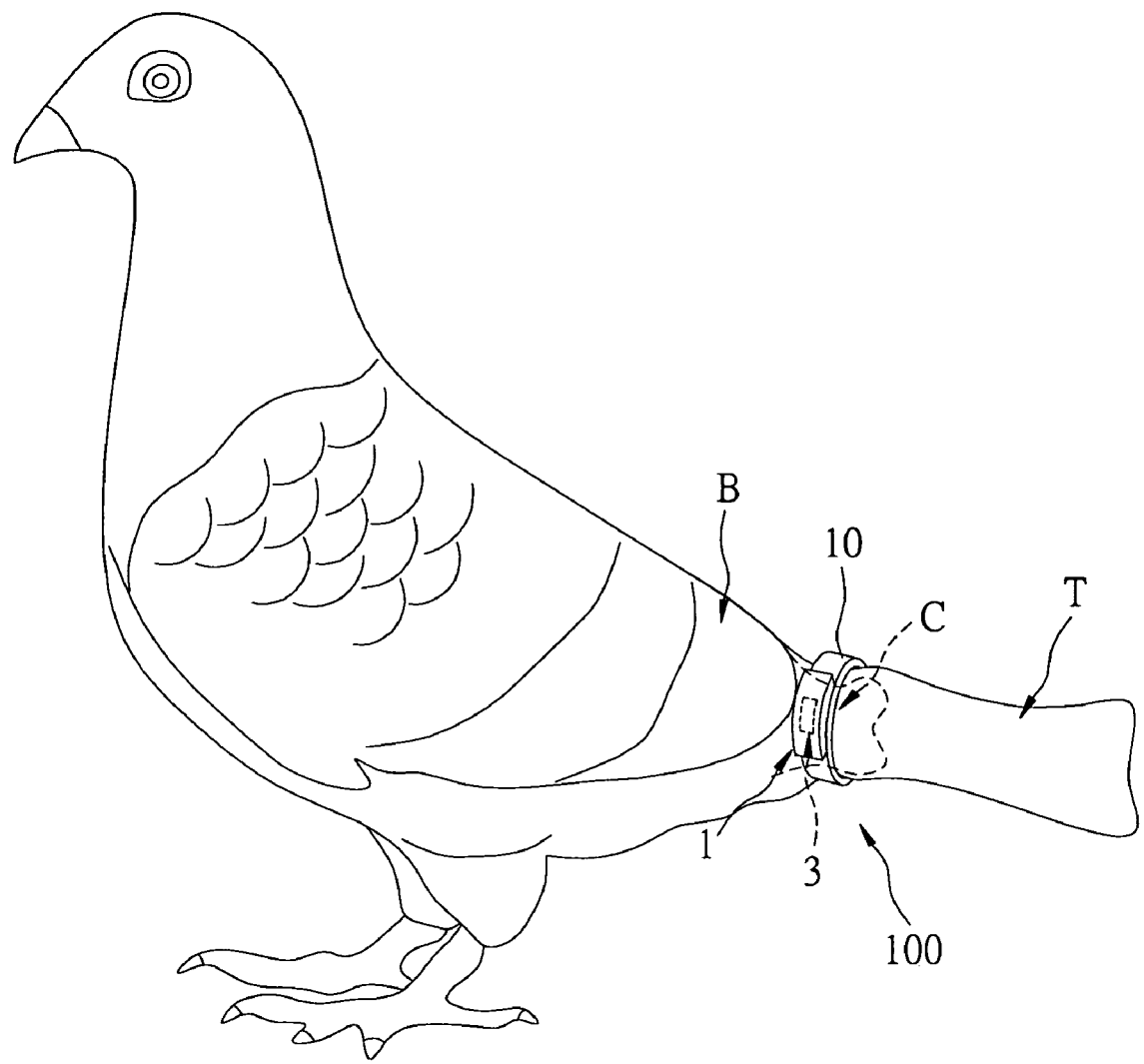
FIG. 2 is usage status diagram of a micro-tracking device for tracing action track of animals according to the first embodiment of the present invention.

The casing module 1 has a fastening device 10 fastened on an animal, and especially the fastening device 10 can be fastened on a flight animal's (such as dove's) concave ring portion C between its body B and tail T as shown in FIG. 2.

The MPU module 2 is disposed in the casing module 1. The GPS module 3 is also disposed in the casing module 1 and is at least electrically connected with the MPU module 2. Moreover, the GPS module 3 has an antenna 30 for receiving action track information of the animal, and the antenna 30 can be a built-in antenna disposed in the GPS module 3 or be an external antenna disposed outside the GPS module 3.

Furthermore, the memory module 4 is disposed in the casing module 1 and is at least electrically connected with the MPU module 2 for recording and storing the action track information. The memory module 4 can be an NVRAM (Non-Volatile Random Access Memory). In addition, the memory module 4 has predetermined recording parameters 40, and the predetermined recording parameters 40 at least include: a current height value and a speed value about the animal, current position and time information about the animal and a recording period. Hence, a user can set the recording parameters 40 according to his/her needs. For example, the user can set that the recording period to one time per every ten minutes for recording the current height value and the speed value of the animal, as well as the current position and time information about the animal.

Moreover, the power supply module 5 is disposed in the casing module 1 and is at least electrically connected with the MPU module 2 for supplying power. In addition, the power supply module can be a built-in rechargeable battery.

Furthermore, the micro-tracking device 100 further includes a transmitted interface module 6 disposed in the casing module 1 and is at least electrically connected with the memory module 4 for transmitting the action track information of the animal to an external storage 7 via a wired or wireless method.

Figure 3:
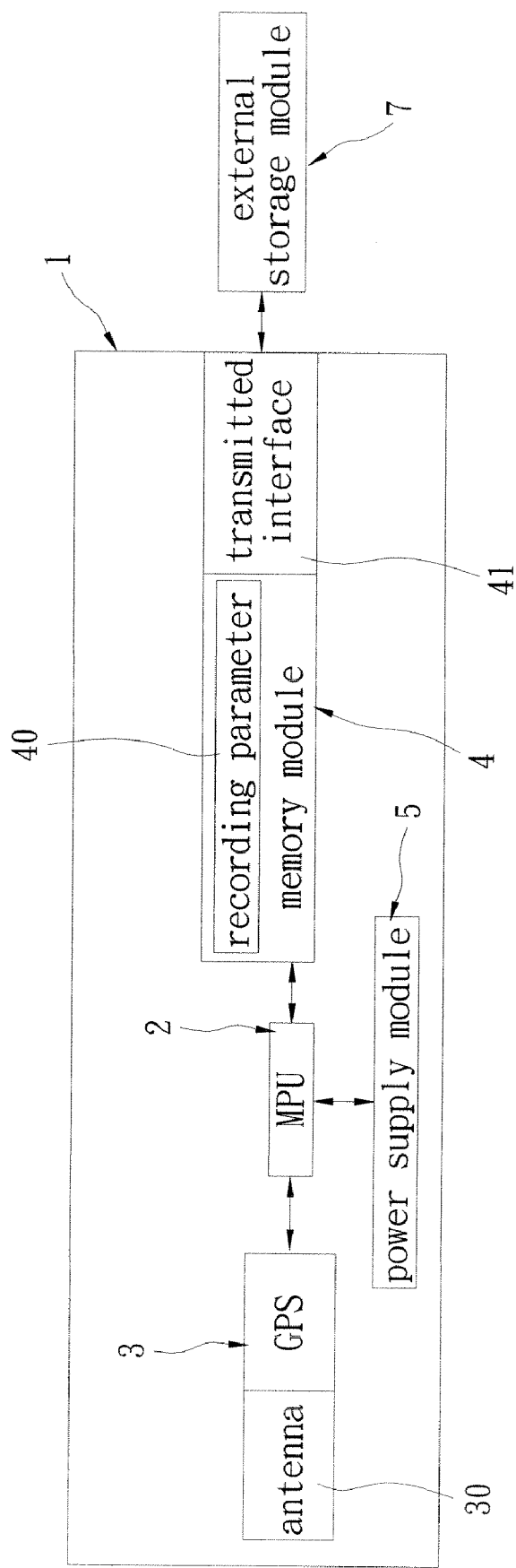
FIG. 3 is a function block diagram of a micro-tracking device for tracing action track of animals according to the second embodiment of the present invention.

FIG. 3 shows a function block diagram of a micro-tracking device for tracing action track of animals according to the second embodiment of the present invention. The difference between the first embodiment and the second embodiment is that in the second embodiment, the memory module 4 has a transmitted interface 41 for transmitting the action track information of the animal to the external storage 7, and the transmitted interface 41 is exposed outside of the casing module 1. Hence, the micro-tracking device 100 of the second embodiment can transmit the action track information via the transmitted interface 41 of the memory module directly without using the transmitted interface module 6, so that the weight of the micro-tracking device 100 of the second embodiment is reduced.

Figure 4:
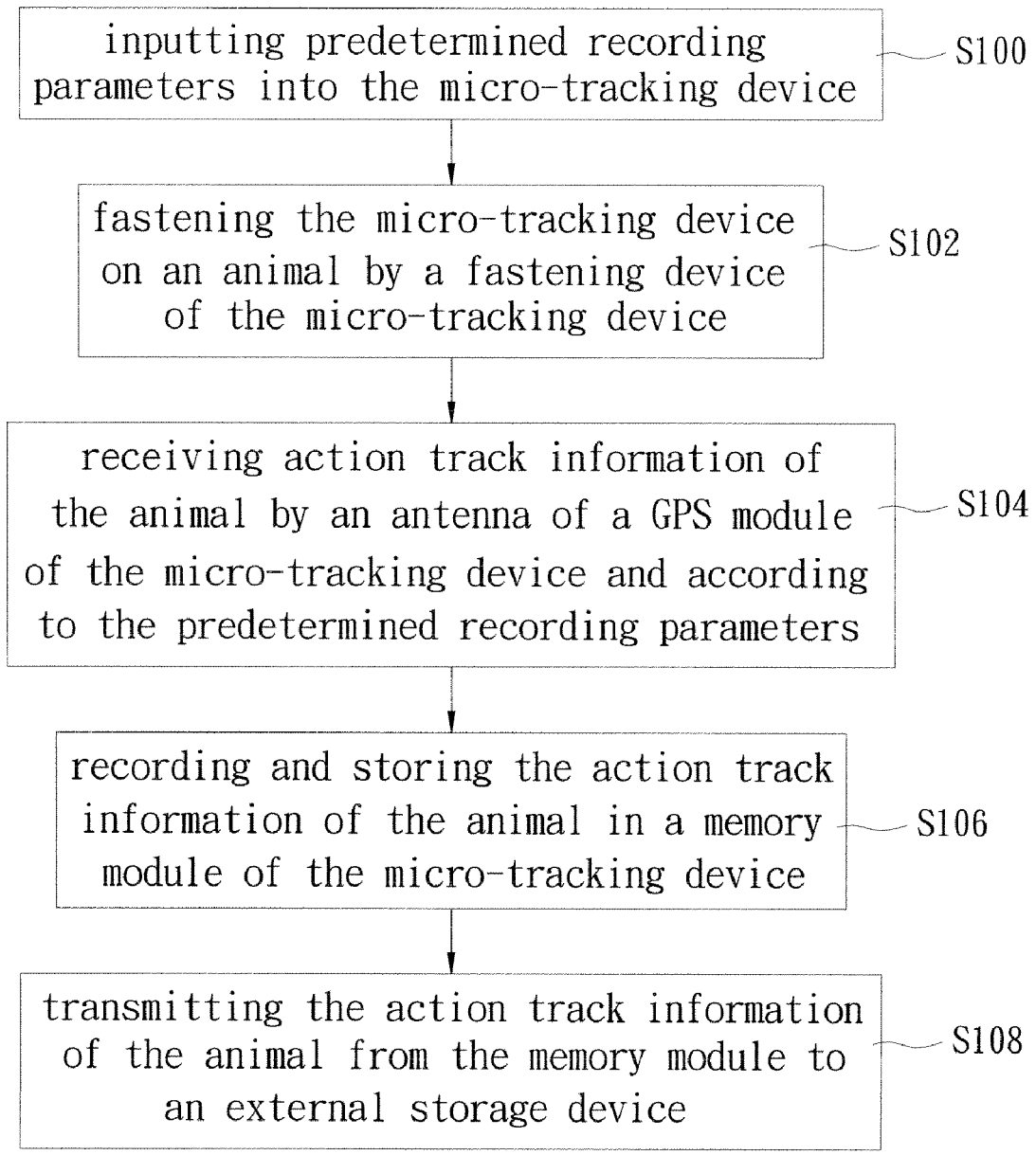
FIG. 4 is a flowchart of a method of using a micro-tracking device for tracing action track of animals.

FIG. 4 shows a flowchart of a method of using a micro-tracking device for tracing action track of animals. The method includes: firstly inputting predetermined recording parameters 40 into the micro-tracking device 100 (S100), wherein the predetermined recording parameters 40 at least include: a current height value and a speed value about the animal, current position and time information about the animal and a recording period; next, fastening the micro-tracking device 100 on an animal via a fastening device 10 of the micro-tracking device 100 (S102), wherein the micro-tracking device 100 can be fastened on a flight animal's (such as dove's) concave ring portion C between its body B and tail T via the fastening device 10 as shown in FIG. 2.

Afterward, the method includes: receiving action track information of the animal via an antenna 30 of a GPS module 3 of the micro-tracking device 100 and according to the predetermined recording parameters 40 (S104); next, recording and storing the action track information of the animal in a memory module 4 of the micro-tracking device 100 (S106); finally transmitting the action track information of the animal from the memory module 4 to an external storage device 7 (S108).

Moreover, after the step of S108, the method further includes: transmitting the action track information of the animal to the external storage 7 via a transmitted interface module 6 and by a wire or wireless method, wherein the transmitted interface module 6 is disposed in the casing module 1 and at least electrically connected with the memory module 4.

Alternatively, after the step of S108, the method further includes: transmitting the action track information of the animal to the external storage 7 via a transmitted interface 41 of the memory module 4, wherein the transmitted interface 41 is exposed outside of the casing module 1 for electrically connecting with the external storage 7 easily.

In conclusion, the micro-tracking device has a weight between 1 and 10 grams and is fastened on any animal's any position (especially a flight animal's concave ring portion between its body and tail), for capturing action track information (for example, a current height value and a speed value of about flight animal, current position and time information about the flight animal) of the animal by using a GPS and controlling action statuses of the animal effectively, so as to solve prior deficiency that is "it is not easy to control the flight situation of certain places training".

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A micro-tracking device for recording a travel path of animals, comprising:
   a casing module having a fastening device fastened on a concave ring portion of a flight animal between a body and a tail of the flight animal;
   a GPS module disposed in the casing module, the GPS module having an antenna for receiving position, speed and time information of the animal;
   an MPU (Micro Process Unit) module disposed in the casing module and being electrically connected to the GPS module for establishing action track parameters at a periodic interval, the action track parameters including a current location, a current height, a current speed and a current time;
   a memory module disposed in the casing module and electrically connected to at least the MPU module for storing a plurality of sequentially established action track parameters and the periodic interval, the plurality of sequentially established action track parameters defining the travel path of the animal;
   an interface module disposed in the casing module and electrically connected to the MPU for selectively communicating the plurality of sequentially established action track parameters to an external storage device, the interface module being disposed in the casing module and electrically connected to at least the memory module; and
   a power supply module disposed in the casing module and electrically connected to at least the MPU module for supplying power thereto;
   wherein the weight of the micro-tracking device is between 1 and 10 grams.

2. The micro-tracking device as claimed in claim 1, wherein the antenna is a built-in antenna disposed in the GPS module.

3. The micro-tracking device as claimed in claim 1, wherein the antenna is an external antenna disposed outside the GPS module.

4. The micro-tracking device as claimed in claim 1, wherein the memory module is an NVRAM (Non-Volatile Random Access Memory).

5. The micro-tracking device as claimed in claim 1, wherein the power supply module is a built-in rechargeable battery.

6. The micro-tracking device as claimed in claim 1, further comprising an interface exposed externally of the casing module and electrically connected to the memory module for directly transferring the plurality of sequentially established action track parameters to an external storage.

7. A method of using a micro-tracking device for recording a travel path of animals, comprising:
   inputting a data collection time interval to the micro-tracking device;

fastening the micro-tracking device on a concave ring portion of a flight animal between a body and a tail of the flight animal via a fastening device of the micro-tracking device;

receiving position, speed and time information of the animal via an antenna of a GPS module of the micro-tracking device repeatedly in accordance with the data collection time interval;

determining action track information from the position, speed and time information at each data collection time interval, the action track information including a current location, a current height, a current speed and a current time;

storing the action track information of the animal in a memory module of the micro-tracking device at each data collection time interval, a plurality of sequentially stored action track information defining the travel path of the animal; and selectively communicating the plurality of sequentially store action track information from the memory module to an external storage device;

wherein the weight of the micro-tracking device is between 1 and 10 grams.

8. The method as claimed in claim 7, wherein the antenna is a built-in antenna disposed in the GPS module.

9. The method as claimed in claim 7, wherein the antenna is an external antenna disposed outside the GPS module.

10. The method as claimed in claim 7, wherein the memory module is an NVRAM (Non-Volatile Random Access Memory).

11. The method as claimed in claim 7, wherein the power supply module is a built-in rechargeable battery.

12. The method as claimed in claim 7, wherein the step of selectively communicating includes the step of directly connecting the external storage device to an interface disposed external to the casing module and electrically connected to the memory module for transferring the plurality of sequentially stored action track information of the animal to the external storage via a wired connection.

13. A micro-tracking device for recording a travel path of animals, comprising:

a casing module having a fastening device fastened on a concave ring portion of a flight animal between a body and a tail of the flight animal;

a GPS module disposed in the casing module, the GPS module having an antenna for receiving position, speed and time information of the animal;

an MPU (Micro Process Unit) module disposed in the casing module and being electrically connected to the GPS module for establishing action track parameters at a periodic interval, the action track parameters including a current location, a current height, a current speed and a current time;

a memory module disposed in the casing module and electrically connected to the MPU module for storing a plurality of sequentially established action track parameters and the periodic interval, the plurality of sequentially established action track parameters defining the travel path of the animal, the memory module including an interface for selectively transferring the plurality of sequentially established action track parameters directly to an external storage device from the memory module, the interface being exposed externally of the casing module for access thereto; and a power supply module disposed in the casing module and electrically connected to at least the MPU module for supplying power thereto;

wherein the weight of the micro-tracking device is between 1 and 10 grams.

* * * * *